US007055722B2

(12) United States Patent
Ouellette

(10) Patent No.: US 7,055,722 B2
(45) Date of Patent: Jun. 6, 2006

(54) SPRAY BOTTLE

(76) Inventor: Marc Ouellette, 390, King Street E., Kingston, ON (CA) K7K 2Y2

( * ) Notice: Subject to any disclaimer, the term of this patent is extended or adjusted under 35 U.S.C. 154(b) by 113 days.

(21) Appl. No.: 10/719,942

(22) Filed: Nov. 25, 2003

(65) Prior Publication Data

US 2004/0112922 A1 Jun. 17, 2004

Related U.S. Application Data

(60) Provisional application No. 60/433,288, filed on Dec. 16, 2002.

(51) Int. Cl.
*G01F 11/26* (2006.01)

(52) U.S. Cl. .................................... 222/454; 222/464.7

(58) Field of Classification Search ................ 222/377, 222/455, 464.1–464.7, 321.1, 321.5, 211, 222/321.7, 382, 321.9, 454, 383.1, 584, 372, 222/385

See application file for complete search history.

(56) References Cited

U.S. PATENT DOCUMENTS

| | | | | | |
|---|---|---|---|---|---|
| 524,245 | A * | 8/1894 | Chameroy | .................. | 222/328 |
| 727,660 | A * | 5/1903 | Masterson | .................. | 222/382 |
| 1,523,688 | A * | 1/1925 | Freeman | ..................... | 222/377 |
| 5,518,150 | A | 5/1996 | Witt | | |
| 6,059,152 | A * | 5/2000 | Mayfield | .................... | 222/382 |
| 2005/0087568 | A1* | 4/2005 | Silvaggio | ................ | 222/383.1 |

* cited by examiner

*Primary Examiner*—Michael Mar
*Assistant Examiner*—Melvin A Cartagena
(74) *Attorney, Agent, or Firm*—Dowell & Dowell, P.C.

(57) ABSTRACT

A spray bottle having a screw neck to which a manual trigger type spray dispenser having a dependent flexible suction tube can be secured. The bottle is provided with a vertical internal wall to divide it into two interconnecting compartments, and the free end of the suction tube is directed into the smaller of the two. A substantially horizontal internal wall is also provided to form a second wall of the smaller compartment to facilitate retention of liquid therein when the bottle is inverted.

18 Claims, 5 Drawing Sheets

SPRAY BOTTLE

CROSS REFERENCE TO RELATED APPLICATION

This application is related to my previously filed U.S. Provisional Application 60/433,288 filed 16 Dec. 2002.

FIELD OF INVENTION

This invention relates to manually operated pump type dispenser containers having a trigger-type spray head with a flexible suction tube depending therefrom, and more particularly to an improved two chamber container in which the free end of the suction tube is contained in a small chamber such that the dispenser can be used in any orientation, including inverted. In a preferred embodiment a guide wall may be provided to facilitate insertion of the free end of the suction tube into the small chamber by automated equipment.

DESCRIPTION OF PRIOR ART

Numerous manually operated pump type dispenser containers, or spray bottles have been described in the prior art and numerous types are in everyday use around the world to dispense such products as window cleaning fluids, shampoos, car wash detergents, and other similar cleaning fluids and polishes. Such bottles are generally manufactured by blow molding techniques, and for ease of manufacture are generally single chamber bottles. This means, however, that once the liquid level has fallen somewhat in the bottle, the bottle cannot be used in anything but the vertical position. Double chamber bottles have been suggested, and attention is directed to, for example, U.S. Pat. No. 5,518,150, which provides a longitudinally extending interior guide wall to facilitate location of the suction tube in the smaller chamber so that the dispenser can be used in a non-upright position. However, when the liquid level in the bottle falls and the bottle is turned beyond the horizontal position, the free end of the suction tube is exposed and not all of the liquid in the bottle can be removed. Others have tried to overcome this problem by adjusting the position of, and reconstructing, the suction tube, with varying degrees of success. There is, therefore, a need for an improved bottle that can be used in almost any orientation including substantially inverted.

OBJECT OF INVENTION

It is an object of the present invention to provide an improved spray bottle incorporating a transverse shelf extending partially across the bottle so as to provide a second chamber into which the free end of a flexible suction tube can be directed and from which substantially all of the contents of the bottle can be removed, whatever the orientation of the bottle. In a preferred embodiment a longitudinal guide wall is also provided so as to facilitate introduction of the free end of the flexible suction tube by automatic machinery.

BRIEF DESCRIPTION OF INVENTION

By one aspect of this invention there is provided a liquid spray dispenser, comprising:

(a) spray dispensing means for dispensing a liquid;

(b) liquid container means for holding a liquid, said container means having a vertical and a horizontal axis and a neck portion adapted adapted to releasably receive and retain said spray dispensing means;

(c) a flexible suction tube depending from the spray dispenser means and in liquid communication therewith;

(d) a pair of partition means, for dividing said container means into liquid-communicating first and second chambers, arranged so as to direct a free end of said suction tube from said spray dispensing means into said first chamber; and (e) wherein at least one of said pair of partition means extends from a side wall of said container means so as to form an internal wall of said first chamber and retain liquid therein when said container means is moved from a vertical position to a horizontal position.

DETAILED DESCRIPTION OF PREFERRED EMBODIMENTS

Figure 1:
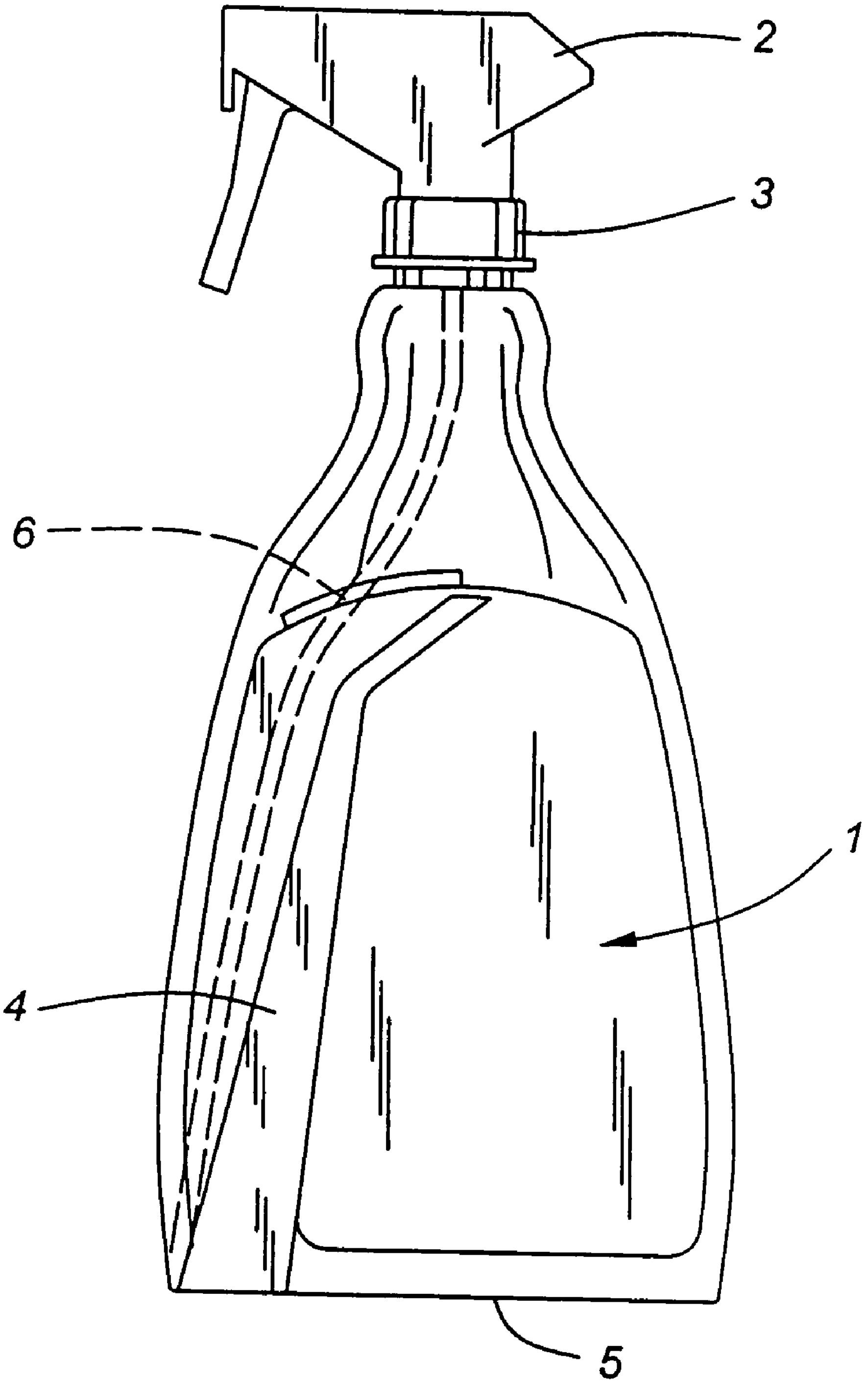
PRIOR ART FIG. 1
FIG. 1 is a side view of a spray bottle of the prior art.

In FIG. 1 there is shown a spray bottle 1, of the prior art, having a trigger type spray 2 and cap 3 screwed thereon. A flexible suction tube 6 depends from the spray 2 and a longitudinal wall 4 is also provided, extending from the base 5 and curving upwardly to a point adjacent the cap 3, to facilitate location of a free end of the suction tube 6 in the small container 7. It will be appreciated that containers of this type are generally produced by blow molding and therefore wall 4 is hollow.

Figure 2:
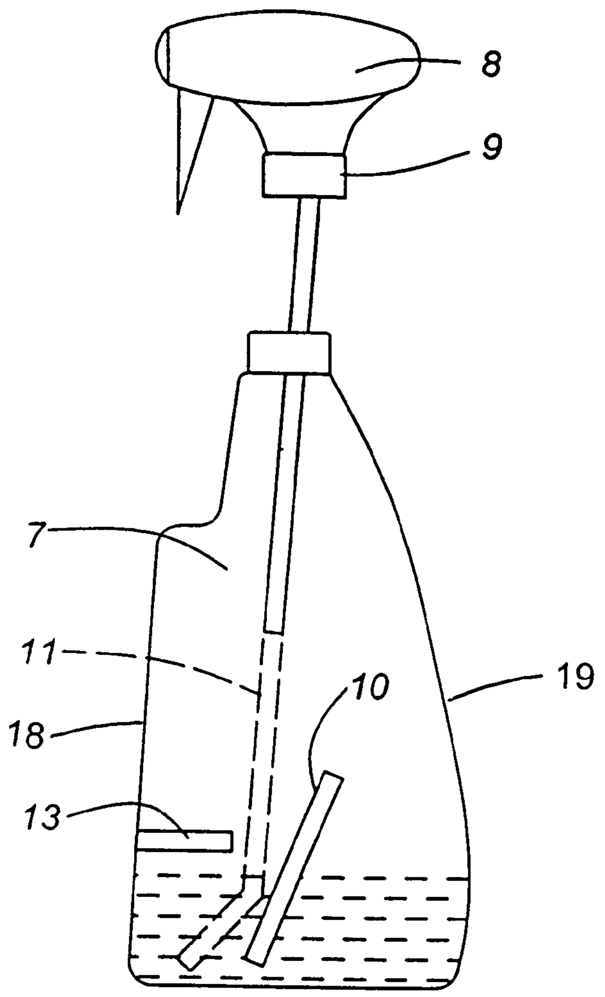
FIG. 2 is a side view of a spray bottle according to one embodiment of the present invention, in the vertical position.
Figure 3:
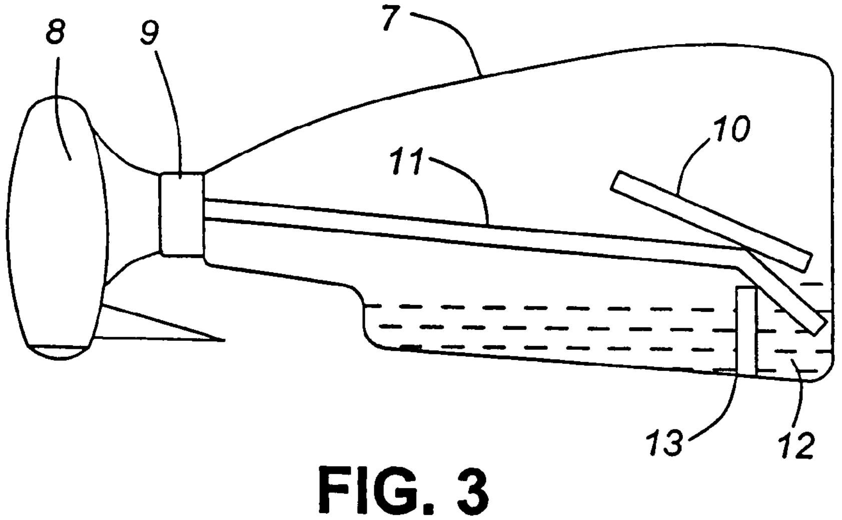
FIG. 3 is a side view of the spray bottle of FIG. 1, in the horizontal position.
Figure 4:
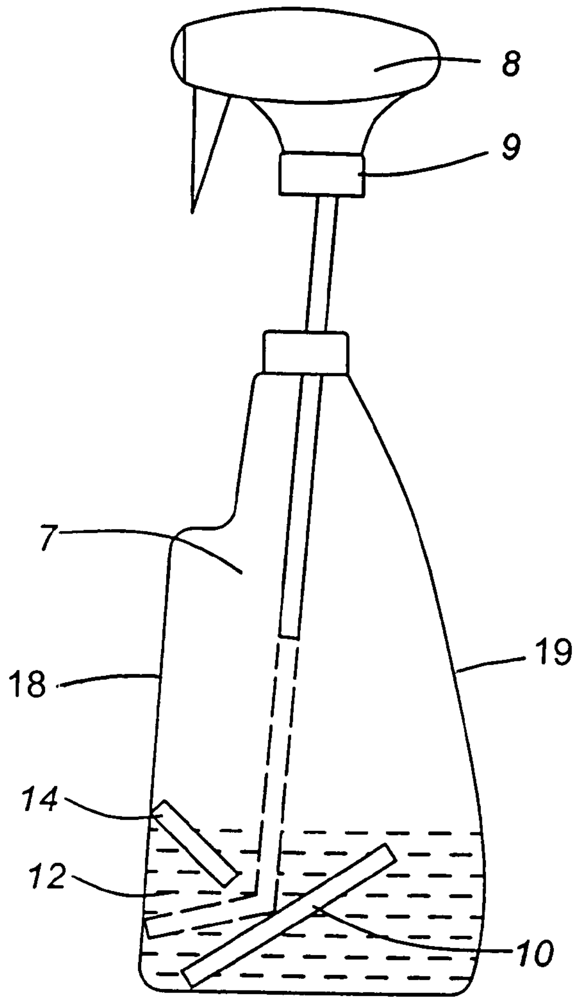
FIG. 4 is a side view of a spray bottle according to an alternative embodiment of the present invention, in the vertical position.
Figure 5:
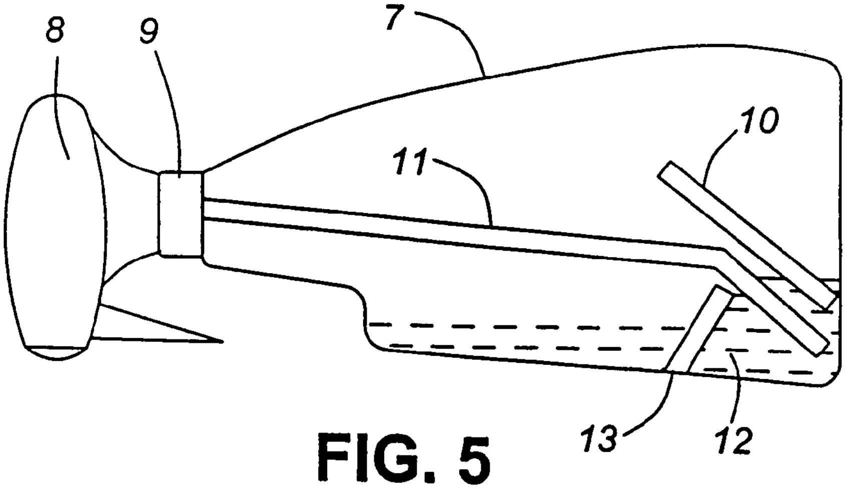
FIG. 5 is a side view of the embodiment of FIG. 3, in the horizontal position.
Figure 6:
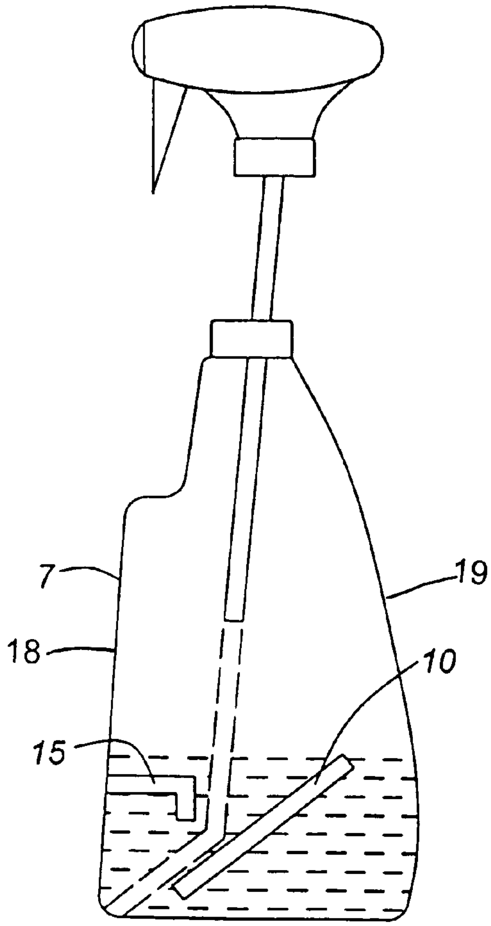
FIG. 6 is a side view of a spray bottle according to another embodiment of the present invention, in the vertical position.
Figure 8:
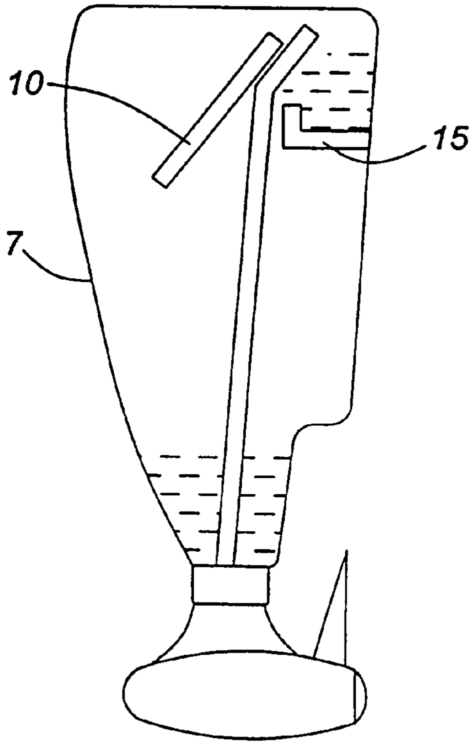
FIG. 8 is a side view of the embodiment of FIG. 6, in an inverted position.
Figure 7:
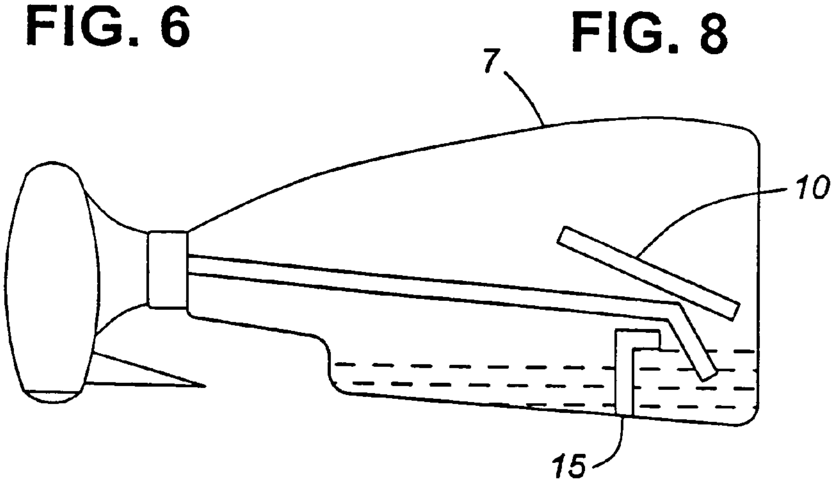
FIG. 7 is a side view of the embodiment of FIG. 6, in the horizontal position.
Figure 9:
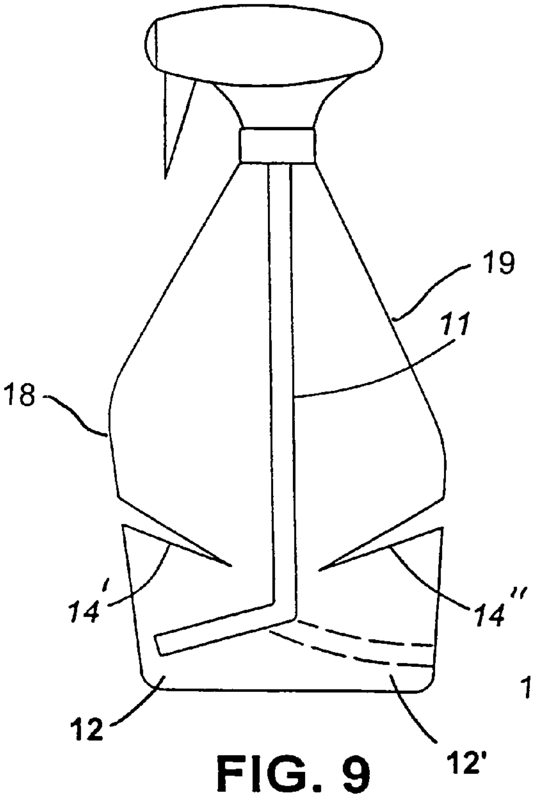
FIG. 9 is a side view of a bottle according to yet another embodiment, in vertical position.
Figure 10:
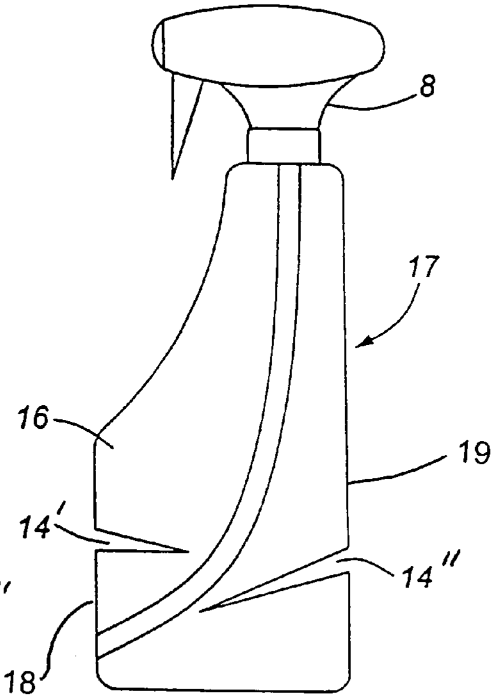
FIG. 10 is a side view of a modified version of the embodiment of FIG. 9, in vertical position.

In FIGS. 2 and 3 there is shown one embodiment of the present invention, which is similar to FIG. 1 in that the bottle 7 is provided with a manual trigger type spray 8, a cap 9 and a longitudinal wall 10 arranged to direct the free end of a suction tube 11, depending from the spray 8 and in liquid communication therewith, into a small reservoir 12. In addition, however, there is provided a transverse wall 13 which extends from the wall of the bottle 7 to a point adjacent but spaced from wall 10 and substantially parallel to the base of the bottle, so that when the bottle 7 is tipped to a horizontal position liquid is trapped in reservoir 12 and the spray remains functional. This remains true even when the bottle is tipped beyond the horizontal. In a preferred embodiment, as shown in FIGS. 4 and 5, the wall 14 does not extend perpendicularly from the side of the bottle, but slopes downwardly (when the bottle is in the upright or vertical position) towards the base of the bottle. This ensures that liquid remains in the reservoir 12 even when the bottle is inverted completely. In FIGS. 6, 7 and 8 there is shown a further embodiment wherein wall 15 extends perpendicularly from the wall of bottle 7, but turns approximately through a right angle so as to provide a reservoir 12 that contains liquid even when the bottle is inverted as seen in FIG. 8. In FIG. 9, there is shown a further alternative embodiment in which two partitions 14' and 14" are placed substantially symmetrically on each side of the bottle to provide a more symmetrical and aesthetically pleasing bottle. The free end of suction tube 11 can thus be directed into either of the reservoirs 12 and 12' by rotating the cap 9 as desired. In FIG. 10, there is shown a slightly modified version of the embodiment of FIG. 9 wherein the two partitions 14' and 14", of unequal length, extend from the side walls of an asymmetrically shaped bottle. So as to direct the free end of the suction tube 11 towards the "heavy side" 16 of the bottle 17. If desired, the manual trigger type spray 8 can be swivelled so as to ensure that the reservoir is always strategically placed for an upward or downward application.

It will be appreciated that although the walls 10, 13, 14 and 15 are shown in solid form in the present drawings, they are preferably hollow and open to the outside on order to facilitate manufacture by blow molding. As shown, the walls 10, 13, 14 and 15 also function as partitions within the container. Walls 13, 14 and 15 are shown extending from one side wall 18 of the container and in FIGS. 9 and 10 the walls 14' and 14" extend from opposite side walls 18 and 19.

I claim:

1. A liquid spray dispenser, comprising:

(a) spray dispensing means for dispensing a liquid;

(b) liquid container means for holding a liquid, said container means having a vertical and a horizontal axis and a neck portion adapted to releasably receive and retain said spray dispensing means; the liquid container means having a first side wall and a second side wall;

(c) a flexible suction tube depending from the spray dispenser means and in liquid communication therewith;

(d) a first partition means extending from the first side wall and terminating at a first free edge region within the container, a second partition means within the container the free edge region of the first partition means being spaced from the second partition means to form an opening therebetween, the first and second partition means and first and second side walls forming a first chamber therebetween, the first chamber being located beneath the first partition means when the liquid container means is in a vertical position, the second partition means being arranged to direct a free end of said suction tube from said spray dispensing means through the opening and into said first chamber, so that the free end of the suction tube lies beneath the first partition means when the liquid container means is in a vertical position (e) wherein when said container means is moved from a vertical position to a horizontal position, fluid is retained in fluid communication with the first partition means in the first chamber and the free end of the suction tube is in fluid communication with the fluid in the first chamber.

2. A liquid spray dispenser as claimed in claim 1 wherein said first partition means is substantially parallel to a horizontal axis when the bottle is in the vertical position.

3. A liquid spray dispenser as claimed in claim 1 wherein one of said first and second partition means is at an angle between a vertical axis and the horizontal axes.

4. A liquid spray dispenser as claimed in claim 1, formed by blow molding and wherein said first and second partition means each have a closed end extending into said dispenser and an open end to an outside surface of said dispenser.

5. A liquid spray dispenser as claimed in claim 1 wherein each of said first and second partition means extend inwardly from said first and second side walls of said bottle.

6. A liquid spray dispenser as claimed in claim 5 wherein said first and second partition means are of equal length.

7. A liquid spray dispenser as claimed in claim 5 wherein said first and second partition means are of unequal length.

8. A liquid spray dispenser as claimed in claim 6 wherein said bottle is a symmetrically shaped bottle.

9. A liquid spray dispenser as claimed in claim 7 wherein said bottle is an asymmetrically shaped bottle.

10. A liquid spray dispenser, comprising:

(a) spray dispensing means for dispensing a liquid;

(b) liquid container means for holding a liquid, said container means having a vertical axis, a horizontal axis and a neck portion adapted to releasably receive and retain said spray dispensing means; the liquid container means having a first side wall and a second side wall;

(c) a flexible suction tube depending from the spray dispenser means and in liquid communication therewith;

(d) a first partition means extending from the first side wall and terminating at a first free edge region, a second partition means extending from the second side wall, the free edge region of the first partition means being spaced from the second partition means to form an opening therebetween, the first and second partition means and first and second side walls forming first and second chambers therebetween, the first chamber being located beneath the first partition means when the liquid container means is in a vertical position and the second chamber being located beneath the second partition means when the liquid container means is in a vertical position, said suction tube having a free end which is arranged to extend from said spray dispensing means through the opening and into the first or second chambers, so that the free end of the suction tube lies beneath the corresponding first or second partition means when the liquid container means is in a vertical position;

(e) wherein when said container means is moved from a vertical position to a horizontal position, fluid is retained in fluid communication with the first partition means in the first chamber or the second partition means in the second chamber and the free end of the suction tube is in fluid communication with the fluid in the first chamber or the second chamber.

11. A liquid spray dispenser as claimed in claim 10, the liquid container means further comprising a neck portion adapted to releasably receive and retain the liquid spray dispensing means, the liquid spray dispensing means being rotatably attached to said neck portion; the first or second partition means cooperating with the rotatably attached liquid spray dispensing means to select the location of the free end of said suction tube to the first chamber or to the second chamber.

12. A spray bottle as claimed in claim 10, wherein said first and second partition means are substantially parallel to said horizontal axis.

13. A spray bottle as claimed in claim 10 wherein said first and second partition means are at an angle between said vertical and horizontal axes.

14. A spray bottle as claimed in claim 10, formed by blow molding and wherein each of said first and second partition means have a closed end extending into said spray bottle and an open end extending to an outside surface of said spray bottle.

15. A spray bottle as claimed in claim 14, wherein said first and second partition means are of equal length.

16. A spray bottle as claimed in claim 14, wherein said first and second partition means are of unequal length.

17. A spray bottle as claimed in claim 14, wherein said bottle is a symmetrically shaped bottle.

18. A spray bottle as claimed in claim 14, wherein said bottle is an asymmetrically shaped bottle.

* * * * *